US012472862B2

United States Patent
Salter et al.

(10) Patent No.: US 12,472,862 B2
(45) Date of Patent: Nov. 18, 2025

(54) VEHICLE ASSEMBLY HAVING CROSS-BAR MOUNTED LIFT ASSIST DEVICE AND OPERATING METHOD

(71) Applicant: Ford Global Technologies, LLC, Dearborn, MI (US)

(72) Inventors: Stuart C. Salter, White Lake, MI (US); William Wurz, San Francisco, CA (US); David Brian Glickman, Southfield, MI (US); Annette Lynn Huebner, Highland, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 942 days.

(21) Appl. No.: 17/411,679

(22) Filed: Aug. 25, 2021

(65) Prior Publication Data

US 2023/0061449 A1 Mar. 2, 2023

(51) Int. Cl.
*B60P 1/54* (2006.01)
*B60P 9/00* (2006.01)
*B62D 63/04* (2006.01)
*B66D 1/00* (2006.01)

(52) U.S. Cl.
CPC ............... *B60P 1/5466* (2013.01); *B60P 9/00* (2013.01); *B62D 63/04* (2013.01); *B66D 1/00* (2013.01)

(58) Field of Classification Search
CPC ......... B60P 1/5466; B60P 9/00; B60P 1/5438; B60P 1/5457; B60P 1/5461; B62D 63/04; B66D 1/00; B25J 5/06
See application file for complete search history.

(56) References Cited

U.S. PATENT DOCUMENTS

| | | | | |
|---|---|---|---|---|
| 3,501,031 A | * | 3/1970 | Whitfield | B60P 1/5466 414/543 |
| 3,547,284 A | * | 12/1970 | Dunbar | B60P 1/5457 104/32.1 |
| 5,028,198 A | * | 7/1991 | Buhr | B60P 1/5442 212/324 |
| 5,393,114 A | * | 2/1995 | Christensen | B60R 9/00 296/3 |
| 5,743,702 A | * | 4/1998 | Gunderson | B60P 1/5442 224/403 |
| 10,421,609 B2 | * | 9/2019 | Otto | B66F 9/07581 |
| 11,345,022 B2 | * | 5/2022 | Sill | B25J 5/06 |

(Continued)

FOREIGN PATENT DOCUMENTS

| | | | | |
|---|---|---|---|---|
| CA | 2764078 A1 | * | 3/2013 | ............... B60R 9/06 |
| CN | 209040018 U | | 6/2019 | |

(Continued)

*Primary Examiner* — Mark C Hageman
(74) *Attorney, Agent, or Firm* — Vichit Chea; Carlson, Gaskey & Olds, P.C.

(57) ABSTRACT

A vehicle assembly according to an exemplary aspect of the present disclosure includes, among other things, a cargo bed of a vehicle and a crossbar spanning the cargo bed. The crossbar is slidable relative to the cargo bed. A lift assist device is mounted to the crossbar. The assembly can include a passenger side rail mounted to a passenger side wall assembly of the cargo bed, and a driver side rail mounted to a driver side wall assembly of the cargo bed. The crossbar can be slidably coupled to both the driver side rail and the passenger side rail.

15 Claims, 5 Drawing Sheets

(56) References Cited

U.S. PATENT DOCUMENTS

| | | | |
|---|---|---|---|
| 11,345,291 B2 * | 5/2022 | Moreno Castro | B60R 9/06 |
| 2002/0082842 A1 | 6/2002 | Viaud | |
| 2005/0254928 A1 * | 11/2005 | Budd | B60P 1/6454 |
| | | | 414/543 |
| 2014/0334907 A1 * | 11/2014 | Piccioni | B25J 15/0608 |
| | | | 414/737 |
| 2019/0283649 A1 * | 9/2019 | Delaurier | B60P 3/07 |
| 2019/0299732 A1 | 10/2019 | Smith et al. | |
| 2022/0016780 A1 * | 1/2022 | McDaniel | B25J 9/1666 |

FOREIGN PATENT DOCUMENTS

| | | | | |
|---|---|---|---|---|
| DE | 202017102737 U1 * | 7/2017 | | B60J 7/062 |
| GB | 2436819 A * | 10/2007 | | B60P 7/15 |

\* cited by examiner

… (1) …

VEHICLE ASSEMBLY HAVING CROSS-BAR MOUNTED LIFT ASSIST DEVICE AND OPERATING METHOD

TECHNICAL FIELD

This disclosure relates generally to a crossbar of a vehicle and, more particularly, to a lift assist device, such as a robotic arm, that is mounted to the crossbar.

BACKGROUND

Many vehicles, such as pickup trucks, include a cargo bed. Various structures have been utilized in connection with the cargo bed to help secure and manage loads within the cargo bed.

SUMMARY

A vehicle assembly according to an exemplary aspect of the present disclosure includes, among other things, a cargo bed of a vehicle and a crossbar spanning the cargo bed. The crossbar is slidable relative to the cargo bed. A lift assist device is mounted to the crossbar.

Another example of the foregoing vehicle assembly includes a passenger side rail mounted to a passenger side wall assembly of the cargo bed, and a driver side rail mounted to a driver side wall assembly of the cargo bed. The crossbar is slidably coupled to both the driver side rail and the passenger side rail.

Another example of any of the foregoing vehicle assemblies includes the passenger and driver side wall assemblies. The passenger and driver side wall assemblies each have an inner side, an outer side, and an upper side. The passenger side rail is mounted directly to the passenger side wall assembly, wherein the driver side rail is mounted directly to the driver side wall assembly.

In another example of any of the foregoing vehicle assemblies, the passenger side rail and the driver side rail are disposed vertically beneath the upper sides of the passenger and driver side wall assemblies.

In another example of any of the foregoing vehicle assemblies, the crossbar is slidable along the passenger and driver side rails between a forward position and a rearward position. The crossbar is closer to a cab of the vehicle when the crossbar in in the forward position than when the crossbar is in the rearward position.

Another example of any of the foregoing vehicle assemblies includes a control module and an actuator assembly. The control module is configured to control the actuator assembly to reposition the crossbar.

In another example of any of the foregoing vehicle assemblies, the lift assist device is mounted atop the crossbar.

In another example of any of the foregoing vehicle assemblies, the lift assist device is mounted to an underside of the crossbar such that the robotic arm is suspended from the crossbar In another example of any of the foregoing vehicle assemblies, the lift assist device is slidably coupled to the crossbar such that the lift assist device is translatable relative to the crossbar in a cross-vehicle direction.

In another example of any of the foregoing vehicle assemblies, the lift assist device is a robotic arm.

Another example of any of the foregoing vehicle assemblies includes a camera operatively connected to the lift assist device.

In another example of any of the foregoing vehicle assemblies, the lift assist is configured to operate in response to a laser. The camera is configured to detect the laser.

Another example of any of the foregoing vehicle assemblies includes a laser pointer that emits the laser. The laser pointer is configured to be operated by a user.

In another example of any of the foregoing vehicle assemblies, the lift assist device is configured to operate in response to voice commands.

A lift assist device operating method according to another exemplary aspect of the present disclosure includes positioning a lift assist device by sliding a crossbar along a length of a vehicle over a cargo bed of the vehicle. The sliding is along a passenger side rail and a driver side rail. The lift assist device is mounted to the crossbar.

Another example of the foregoing method includes translating the lift assist device in a cross-vehicle direction relative to the crossbar.

In another example of any of the foregoing methods, the lift assist device is a robotic arm.

In another example of any of the foregoing methods, the lift assist device is mounted atop the crossbar.

In another example of any of the foregoing methods, the positioning is initiated in response to a voice command from a user.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a crossbar utilized in connection with a cargo bed of a vehicle, and a lift assist device that is mounted to the crossbar. The crossbar can be slidably coupled to rail assemblies. The crossbar can be repositioned by sliding the crossbar along the rails. The repositioning of the crossbar along the rails can be automatic.

Figure 1:
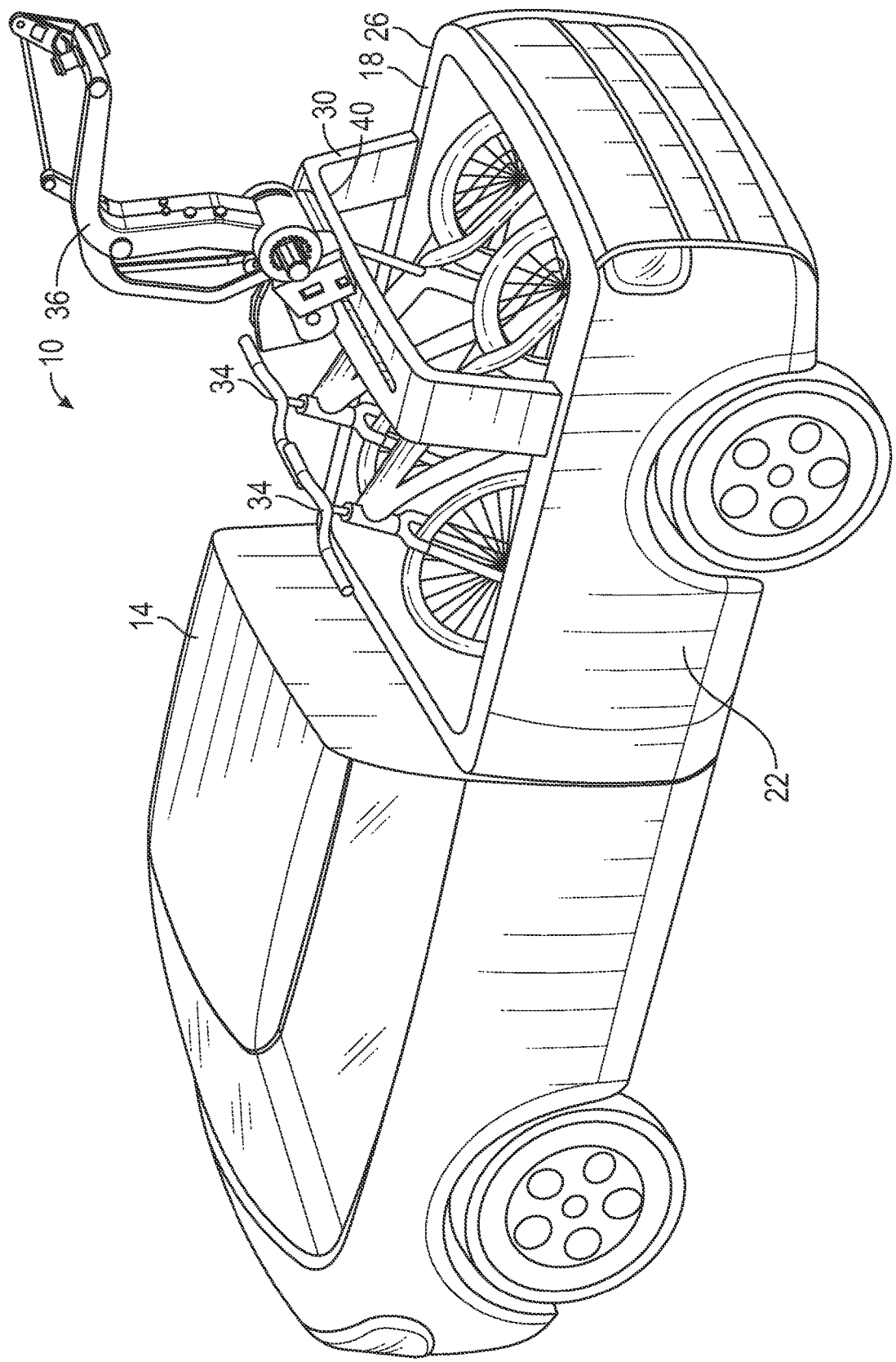
FIG. 1 illustrates a perspective view of a vehicle having a cargo bed and a crossbar with a lift assist device mounted atop the crossbar.
Figure 2:
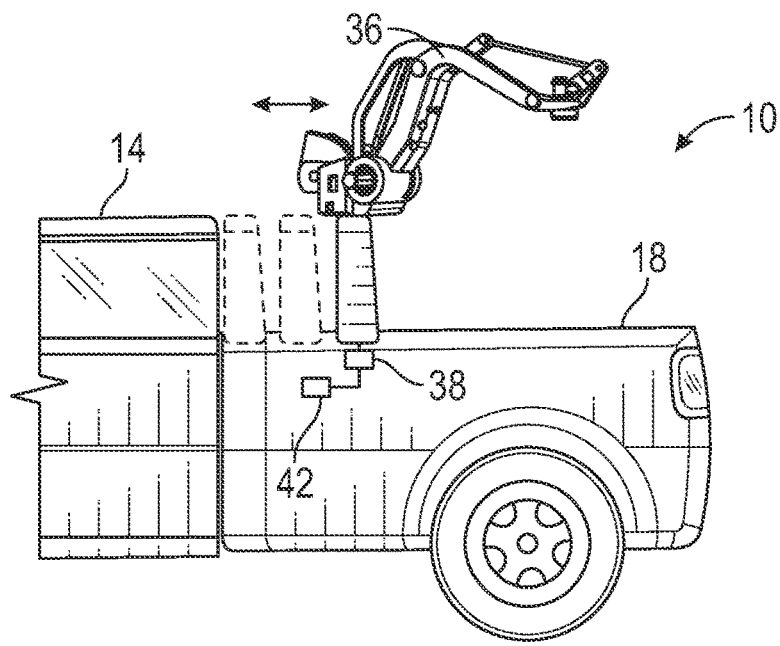
FIG. 2 illustrates a side view of a portion of the vehicle in FIG. 1.

With reference to FIGS. 1 and 2, an exemplary vehicle 10 includes a cab 14 and a cargo bed 18 that is aft the cab 14. The vehicle 10 is a pickup truck in this example.

The cargo bed 18 includes a driver side wall assembly 22 and a passenger side wall assembly 26. A crossbar 30 extends from the driver side wall assembly 22, over the cargo bed 18, to the passenger side wall assembly 26. The crossbar 30 can be utilized to secure a load 34 within the cargo bed 18. The load 34 can be tied to the crossbar 30, for example.

A lift assist device 36 is mounted atop the crossbar 30. The lift assist device 36 can be used to assist in loading cargo, such as the load 34, into the cargo bed 18. In another example, the lift assist device 36 is mounted to an underside 40 of the crossbar 30 such that the lift assist device 36 is suspended from the crossbar 30.

The crossbar 30 can be repositioned by sliding between forward positions and rearward positions along a length of the cargo bed 18. Repositioning the crossbar 30 repositions the lift assist device 36. The crossbar 30 can be repositioned to reposition the lift assist device 36.

In this example, the lift assist device 36 is slidably mounted to the crossbar 30 such that the lift assist device 36 can slide back-and-forth in a cross-vehicle direction. The lift assist device 36 can additionally be repositioned by translating the lift assist device 36 in a cross-vehicle direction relative to the crossbar 30.

The vehicle 10, in this example, includes an actuator assembly 38 and a control module 42. In response to commands from the control module 42, the actuator assembly 38 can move the crossbar 30 forward and aft along the cargo bed 18. The actuator assembly 38 can also move the lift assist device 36 relative to the crossbar 30 in a cross-vehicle direction.

The control module 42 is shown schematically in FIG. 2. It should be understood that the control module 42 may include hardware and software, and could be part of an overall vehicle control module, such as a battery on-board control module, or vehicle system controller (VSC), or could alternatively be a standalone controller separate from VSC.

In an example embodiment, some of the operations of the control module 42 described herein may be performed by separate control modules, such as the on-board control module, and vehicle control module. In this regard, the control module 42 may include one or more of an on-board control module and vehicle control module.

The control module 42 can be programmed with executable instructions for interfacing with and operating the various components of the vehicle 10. The control module 42 can include a processing unit and non-transitory memory for executing the various control strategies and modes. In an example, the control module 42 includes, as memory, electrically erasable programmable read-only memory (EEPROM), which is a type of non-volatile memory often used in computers and remote keyless systems. EEPROMs can be programmed and erased in circuit by applying special programming signals, which may be sent by the control module 42.

In an example, the actuator assembly 38 includes a motor within the driver side wall assembly 22 and another motor within the passenger side wall assembly 26. The motors can be used to drive forward and rearward movements of the crossbar 30. The motors may include a mechanical break to hold a position of the crossbar 30.

In particular, the actuator assembly 38 associated with the driver side wall 22 can comprises a DC motor that drives a screw mechanism through a set of reduction gears. The driving or rotating of the screw mechanism by the DC motor moves a platform or base along the driver side wall 22. The crossbar 30 is secured directly to the platform or base.

Another DC motor, screw mechanism, and set of reduction gears are associated with the passenger side wall 22 and used to drive the passenger side of the crossbar. While an exemplary type of actuator assembly 38 is described above, other options for moving the crossbar 30 are contemplated and fall within the scope of this disclosure.

The actuator assembly 38 can be activated by the control module 42 in response to a command from a user. The command causes the actuator assembly 38 to move the crossbar 30. The command may be sent through a smart device, such as a smart phone. In another example, the user interacts with a touchscreen inside the cab 14 to cause the control module to initiate the command.

Figure 3:
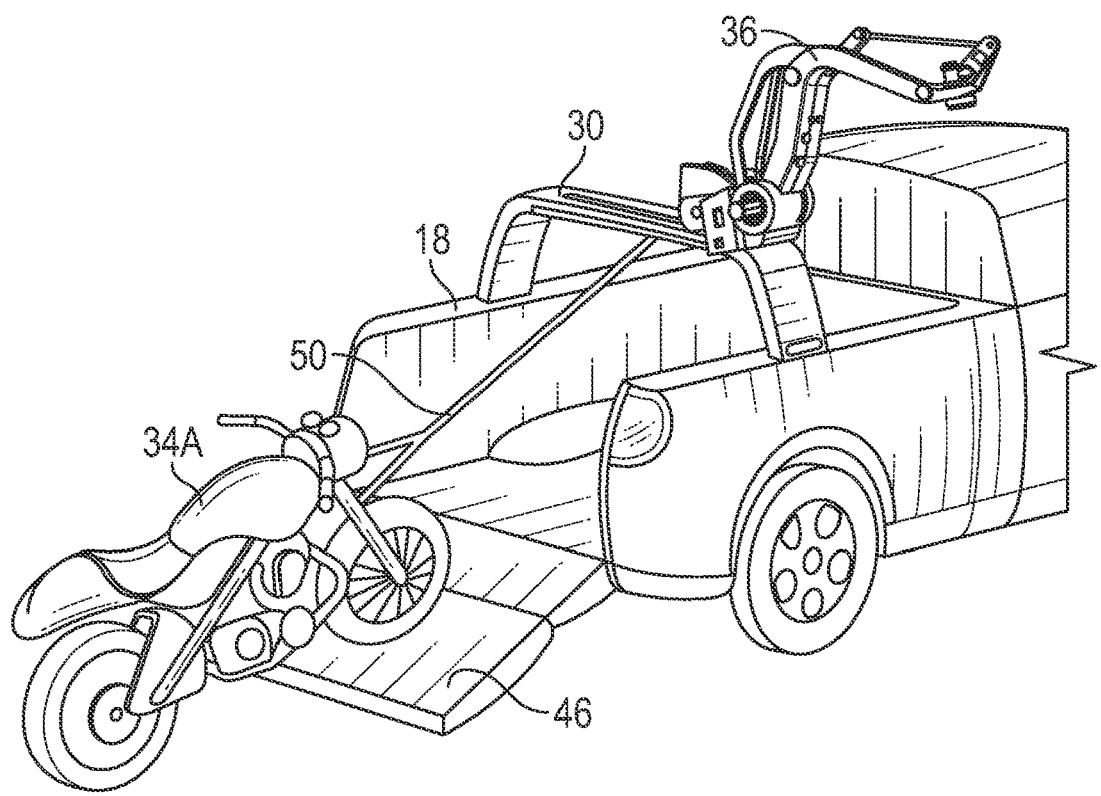
FIG. 3 illustrates a perspective view of a portion of the vehicle of FIG. 1 as the crossbar is being used to move a load into the cargo bed.

With reference to FIG. 3, the crossbar 30 can, in some examples, be moved to help move a load 34A into the cargo bed 18. In this example, a tailgate 46 of the vehicle 10 is first lowered. The load 34A is then tethered to the crossbar 30 utilizing a rope or cable 50. Next, the actuator assembly 38 is activated to move the crossbar 30 forward in the direction D, which pulls the cable 50 to pull the load 34A up the tailgate 46 into the cargo bed 18.

In some examples, a winch, such as a gantry-style winch, can be mounted to the crossbar 30 and can be used to pull the cable 50. The winch could be slidable back-and-forth along the crossbar 30 to facilitate positioning the winch for certain operations, or to provide clearance for items loaded in the cargo bed 18. More than one winch could be used to pull the load 34A. The crossbar 30 can be moved along the rails 70 while the winch is pulling the load 34A. This can keep the angle of the pulling parallel to the tailgate 46 until the front wheels of the load 34A crest the tailgate 46 or the crossbar 30 has moved forward as far as possible.

Figure 4:
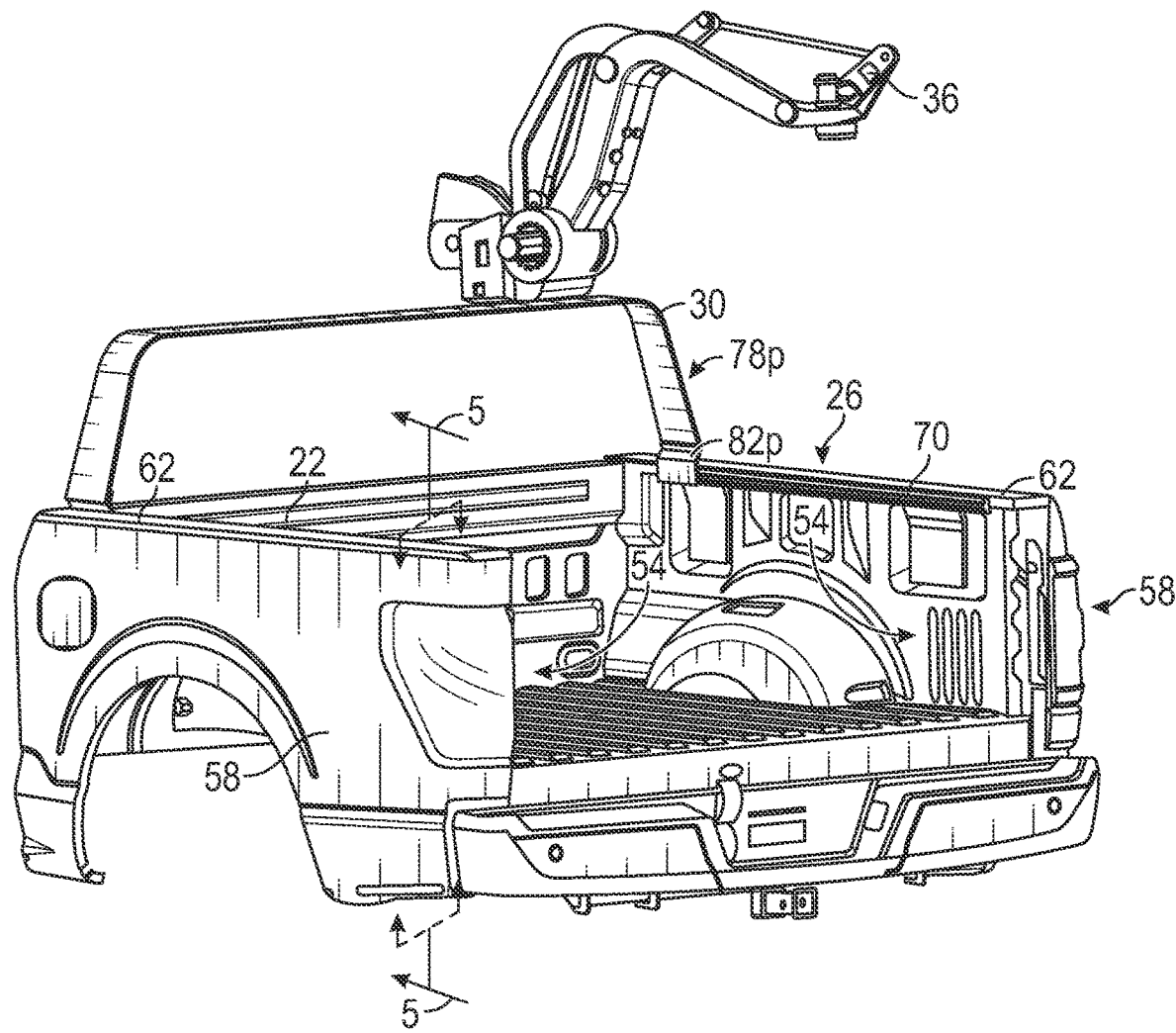
FIG. 4 illustrates a perspective view of the crossbar and cargo bed of FIG. 1 with selected portions removed.
Figure 5:
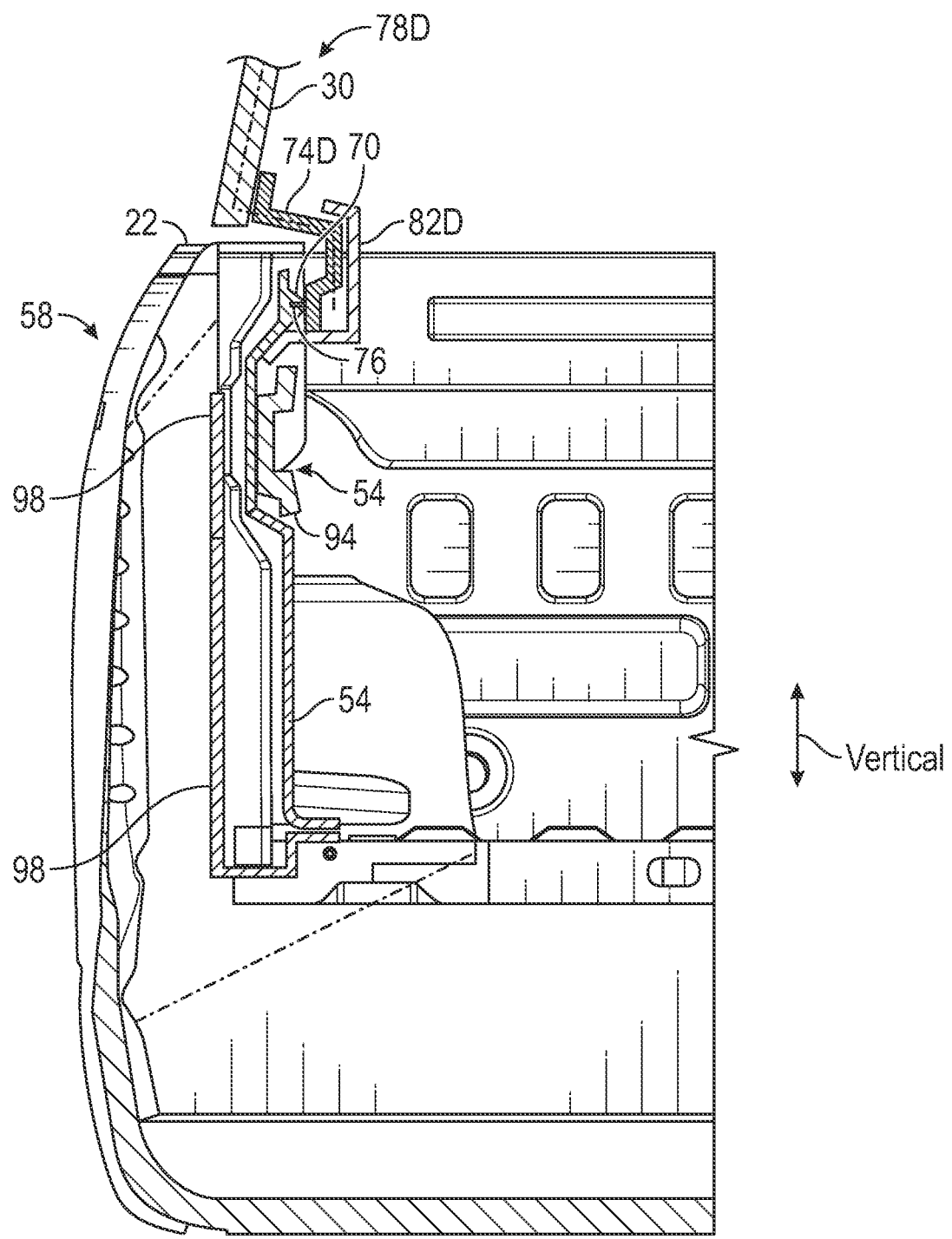
FIG. 5 illustrates a section view taken at line 5-5 in FIG. 4.

With reference now for FIGS. 4 and 5, the driver side wall assembly 22 and the passenger side wall assembly 26 each include an inner side 54, an outer side 58, and an upper side 62. A rail 70 is mounted to the inner side 54 of the driver side wall assembly 22. Another rail 70 is mounted to the inner side 54 of the passenger side wall assembly 26.

To slidably couple the crossbar 30 to the rails 70, a driver side mounting bracket 74D couples an end portion 78D of the crossbar 30 to the driver side rail 70. A passenger side mounting bracket couples a passenger side end portion 78P of the crossbar 30 to the passenger side rail 70.

The driver side mounting bracket 74D has a portion slidably coupled to the driver side rail 70. The passenger side mounting bracket 74P has a portion slidably coupled to the passenger side rail 70. In this example, the mounting brackets 74D engages with the rail 70 through a roller and bushing assembly 76, which can transfer a load from the crossbar 30 to the respective rail 70.

A cover 82D conceals at least part of the mounting bracket 74D and the roller and bushing assembly 86. The cover 82D can help to protect these components from dirt and damage The cover 82D can allow wiring (e.g., wiring used to power the actuator assembly 38) to travel in a manner similar to that of a sliding door on conventional vehicles while protecting the wiring. Another cover 82P conceals at least part of the mounting bracket on the passenger side along with the associated roller and bushing assembly.

The rail 70 can mount directly to the inner sides 54 of the driver side wall assembly 22 and the passenger side wall assembly 26. The rail 70 may mount to existing cargo management tie down locations and structural parts for automobiles sold under the BOXLINK® name.

In the exemplary embodiment, the rails 70 are mounted such that the rails 70 are vertically beneath the upper sides 62 of the driver side wall assembly 22 and the passenger side wall assembly 26. This helps to hide the rails 70 from view. All portions of the crossbar 30, in this example, are vertically above the upper sides 62. Vertical, for purposes of this disclosure, is with reference to ground and an ordinary orientation of the vehicle 10 during operation.

The example lift assist device 36 is a robotic arm. In a specific example, the lift assist device 36 is a palletizing arm. The lift assist device 36 can be used to accomplish a variety of tasks, such as loading cargo, painting a building, supporting an object while the object is installed, etc.

When the lift assist device 36 is needed on the passenger side of the vehicle 10, the lift assist device 36 (FIG. 2) the control module 42 can cause the actuator assembly 38 to translate the lift assist device 36 along the crossbar 30 to the passenger side. When the lift assist device 36 is needed on the driver side, the lift assist device 36 can translate over to the driver side. Mounting the lift assist device 36 on the crossbar 30 rather than the cargo bed 18, for example, keeps the cargo bed 18 accessibly for cargo.

Figure 6:
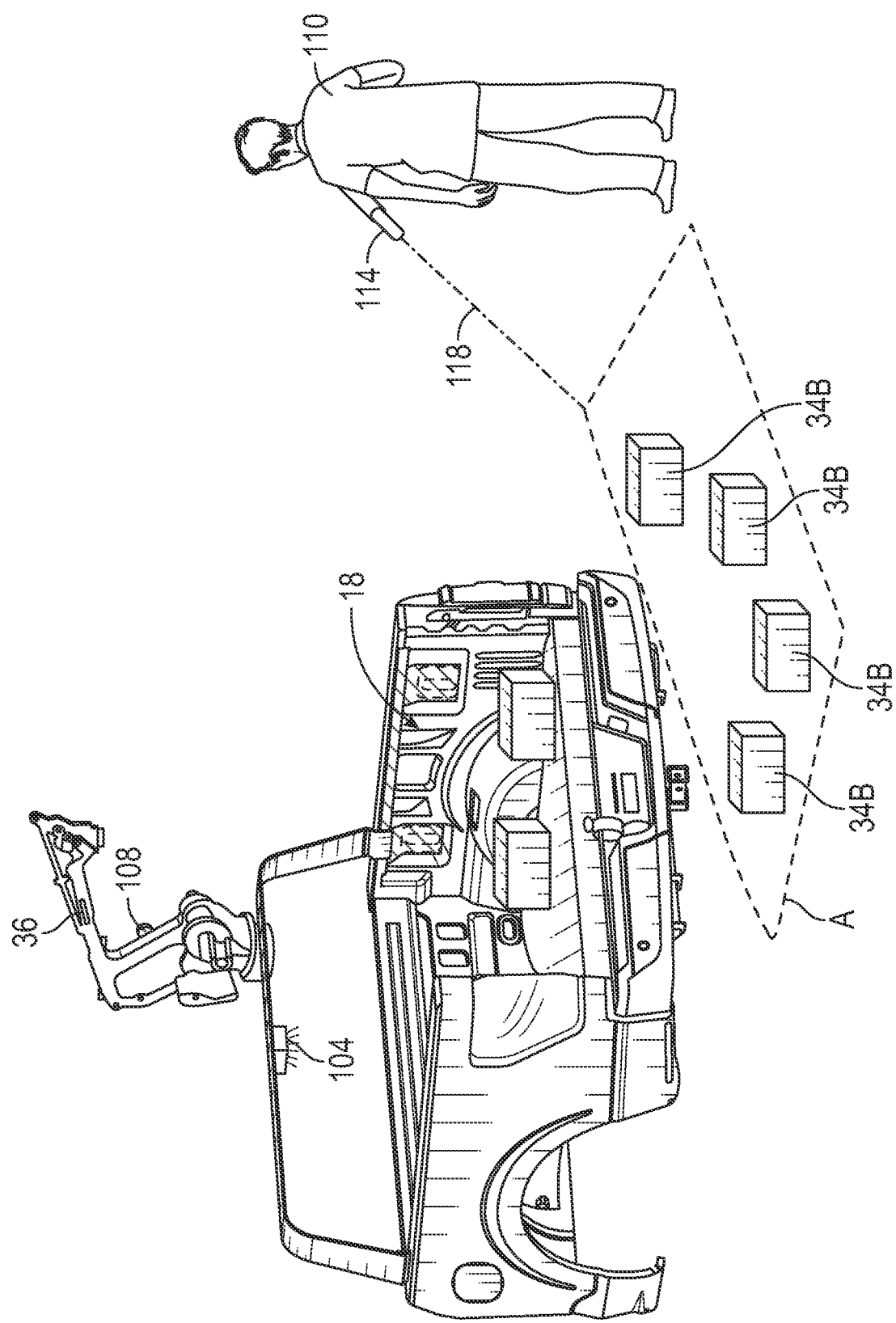
FIG. 6 illustrates a perspective view of the cargo bed and crossbar when beginning to load items using the lift assist device.

With reference now to FIG. 6, a camera assembly 104 can be mounted to the crossbar 30. Another camera assembly 108 can be mounted to the lift assist device 36. The camera assemblies 104, 108 can be operatively connected to the lift assist device 36 through an ethernet connection, for example.

Field of view for the cameras 104, 108 can be changed by moving the crossbar 30 fore and aft within the vehicle 10. Field of view for the camera 108 can additionally be changed by translating the lift assist device 36 along the crossbar 30 and/or by moving the lift assist device 36.

The example camera assemblies 104, 108 can incorporate various types of sensors and emitters, such as radar sensors and emitters. The sensors and emitters can be used to facilitate positioning the crossbar 30, the lift assist device 36, or both. Other components could be used to position the crossbar 30 and lift assist device 36 in other examples.

In an example, operation of the lift assist device 36 can utilize a laser to facilitate identifying how the lift assist device 36 should operate. For example, with reference to FIG. 6, a user 110 holds a laser pointer 114 and emits a beam 118 from the laser pointer 114. The user 110 defines an area A using the laser beam 118. The area A includes the items that make up the load 34B that the user 110 wants the lift assist device 36 to place into the cargo bed 18. The cameras 104, 108 detect the laser beam 118 and the area A. The lift assist device 36 can then load the items 122 within the area A into the cargo bed 18. The laser pointer 114 and is used to define the job for the lift assist device 36

In another example, the lift assist device 108 or the vehicle 10 could emit a laser from a laser puddle lamp projector or another type of emitter toward the items that the vehicle 10 and the control module 38 interprets as needing to be moved by the lift assist device 36. The user 110 can view the emitted laser and can quickly ascertain whether the lift assist device 108 has identified the load that should be moved by the lift assist device 36. The user can then confirm, via voice command for example, that the correct items have been identified. After receiving confirmation, the lift assist device 108 loads the items into the cargo bed 18.

In yet another example, the vehicle 10 and/or the lift assist device 108 can take instructions from the user 110 and transmit an annotated image to the user's smartphone to detect prompt the user 110 to confirm that the correct items have been identified. For example, the operator may circle the items to be loaded in the picture using their finger on the cell phone.

In some examples, the lift assist device 36 is configured to operate in response to voice commands. For example, a microphone could detect a command from the user 110. The command may be "lift this item." In response, the lift assist device 36 moves near an item that the lift assist device 36 interprets as the item that the user desired to be lifted. The user is then able to ascertain whether or not the lift assist device 36 has identified the correct item.

The lift assist device 36 then waits for feedback from the user, which could be another verbal command, such as "confirmed." The lift assist device 36, after receiving feedback that the identified item is correct, lifts the item.

The feedback from the user could indicate other things too. For example, the feedback may inform the lift assist device 36 to "move further right" or "move further left," which can help the lift assist device 36 identify the correct item. The lift assist device 36 can indicate that the lifting is finished through a speaker, for example.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
a cargo bed of a vehicle;
a crossbar spanning the cargo bed, the crossbar slidable relative to the cargo bed;
a lift assist device mounted atop the crossbar;
a passenger side rail mounted to a passenger side wall assembly of the cargo bed; and
a driver side rail mounted to a driver side wall assembly of the cargo bed, wherein the crossbar is slidably coupled to both the driver side rail and the passenger side rail.

2. The vehicle assembly of claim 1, further comprising the passenger and driver side wall assemblies, wherein the passenger and driver side wall assemblies each have an inner side, an outer side, and an upper side, wherein the passenger side rail is mounted directly to the passenger side wall assembly, wherein the driver side rail is mounted directly to the driver side wall assembly.

3. The vehicle assembly of claim 2, wherein the passenger side rail and the driver side rail are disposed vertically beneath the upper sides of the passenger and driver side wall assemblies.

4. The vehicle assembly of claim 1, wherein the crossbar slidable along the passenger and driver side rails between a forward position and a rearward position, the crossbar closer to a cab of the vehicle when the crossbar in in the forward position than when the crossbar is in the rearward position.

5. The vehicle assembly of claim 1, further comprising a control module and an actuator assembly, the control module configured to control the actuator assembly to reposition the crossbar.

6. The vehicle assembly of claim 1, wherein the lift assist device is mounted to an underside of the crossbar such that the lift assist device is suspended from the crossbar.

7. The vehicle assembly of claim 1, wherein the lift assist device is slidably coupled to the crossbar such that the lift assist device is translatable relative to the crossbar in a cross-vehicle direction.

8. The vehicle assembly of claim 1, wherein the lift assist device is a robotic arm.

9. The vehicle assembly of claim 1, further comprising a camera operatively connected to the lift assist device.

10. The vehicle assembly of claim 1, wherein the lift assist device is configured to operate in response to voice commands.

11. A vehicle assembly, comprising:
   a cargo bed of a vehicle;
   a crossbar spanning the cargo bed, the crossbar slidable relative to the cargo bed; and
   a lift assist device mounted to the crossbar a camera operatively connected to the lift assist device, wherein the lift assist is configured to operate in response to a laser, the camera configured to detect the laser.

12. The vehicle assembly of claim 11, further comprising a laser pointer that emits the laser, the laser pointer configured to be operated by a user.

13. A lift assist device operating method, comprising:
   positioning a lift assist device by sliding a crossbar along a length of a vehicle over a cargo bed of the vehicle, the crossbar sliding along a passenger side rail and a driver side rail, the lift assist device mounted to the crossbar; and
   translating the lift assist device in a cross-vehicle direction relative to the crossbar, wherein the lift assist is a robotic arm.

14. The lift assist device operating method of claim 13, wherein the lift assist device is mounted atop the crossbar.

15. The lift assist device operating method of claim 13, wherein the positioning is initiated in response to a voice command from a user.

\* \* \* \* \*